US009146454B2

(12) United States Patent
Coleman et al.

(10) Patent No.: US 9,146,454 B2
(45) Date of Patent: Sep. 29, 2015

(54) CLEANABLE COATING FOR PROJECTION SCREENS

(71) Applicant: RealD Inc., Beverly Hills, CA (US)

(72) Inventors: David A. Coleman, Louisville, CO (US); Gary D. Sharp, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 14/313,364

(22) Filed: Jun. 24, 2014

(65) Prior Publication Data

US 2014/0307313 A1    Oct. 16, 2014

Related U.S. Application Data

(63) Continuation of application No. 13/250,638, filed on Sep. 30, 2011, now Pat. No. 8,760,760.

(60) Provisional application No. 61/388,372, filed on Sep. 30, 2010.

(51) Int. Cl.
  *G03B 21/60*    (2014.01)
  *G03B 21/604*    (2014.01)
  *G03B 21/625*    (2014.01)
  *G03B 21/56*    (2006.01)
  *G03B 21/602*    (2014.01)

(52) U.S. Cl.
  CPC .............. *G03B 21/60* (2013.01); *G03B 21/604* (2013.01); *G03B 21/56* (2013.01); *G03B 21/602* (2013.01); *G03B 21/625* (2013.01); *Y10T 428/24355* (2015.01)

(58) Field of Classification Search
  CPC ..................................................... G03B 21/60

USPC ......................................................... 359/459
  See application file for complete search history.

(56) References Cited

U.S. PATENT DOCUMENTS

| 2,524,286 | A | * | 10/1950 | Dreyer ..................... 359/487.02 |
| 5,717,453 | A | * | 2/1998 | Wohlstadter ..................... 348/46 |
| 6,014,259 | A | * | 1/2000 | Wohlstadter ................. 359/619 |
| 6,033,774 | A | * | 3/2000 | Yitzchaik et al. ............. 428/333 |
| 6,229,981 | B1 | | 5/2001 | Kida |
| 6,270,946 | B1 | * | 8/2001 | Miller ........................... 430/296 |
| 6,299,981 | B1 | * | 10/2001 | Azzopardi et al. ............ 428/429 |
| 6,437,920 | B1 | | 8/2002 | Wohlstadter |

(Continued)

OTHER PUBLICATIONS

Gelest Inc., Hydrophobicity, Hydrophilixity and Silane Surface Modification Material for: Water-Repellents, Morrisville PA, pp. 1-76.*

(Continued)

*Primary Examiner* — Clayton E Laballe
*Assistant Examiner* — Kevin Butler
(74) *Attorney, Agent, or Firm* — Darlene K. Kondo; Neil G. J. Mothew

(57) ABSTRACT

A method for providing a projection screen for receiving stereoscopic images may include providing a substrate with a contoured, reflective surface, wherein light reflected from the substrate substantially may undergo no more than a single reflection and may also include coating a first layer on the substrate with a contoured, reflective surface. The first layer may substantially maintain the same optical properties as the substrate without the first layer. The first layer may be substantially conformal to the surface of the substrate and also may be a self assembled monolayer coating which may include at least a functional group that is hydrophobic.

18 Claims, 4 Drawing Sheets

(56) References Cited

U.S. PATENT DOCUMENTS

| | | | |
|---|---|---|---|
| 6,451,432 B1* | 9/2002 | Azzopardi et al. | 428/429 |
| 6,452,653 B1* | 9/2002 | Yamanaka et al. | 349/113 |
| 6,683,725 B2* | 1/2004 | Wohlstadter | 359/626 |
| 6,909,555 B2* | 6/2005 | Wohlstadter | 359/626 |
| 7,160,583 B2* | 1/2007 | Frey et al. | 427/437 |
| 7,167,313 B2* | 1/2007 | Wohlstadter | 359/619 |
| 7,190,518 B1* | 3/2007 | Kleinberger et al. | 359/465 |
| 7,387,856 B2* | 6/2008 | Chari et al. | 430/20 |
| 7,436,576 B2* | 10/2008 | Clarke et al. | 359/296 |
| 7,440,153 B2* | 10/2008 | Lee et al. | 359/15 |
| 7,443,596 B1* | 10/2008 | Berge | 359/666 |
| 7,621,648 B2* | 11/2009 | Wuillaume et al. | 359/883 |
| 7,648,034 B2* | 1/2010 | Charkoudian et al. | 210/490 |
| 7,854,959 B2* | 12/2010 | Spencer et al. | 427/2.13 |
| 7,898,734 B2 | 3/2011 | Coleman et al. | |
| 2002/0126396 A1* | 9/2002 | Dolgoff | 359/743 |
| 2002/0159156 A1* | 10/2002 | Wohlstadter | 359/626 |
| 2002/0160522 A1* | 10/2002 | Rubinstein et al. | 436/164 |
| 2002/0168511 A1* | 11/2002 | Schneider et al. | 428/333 |
| 2003/0068436 A1* | 4/2003 | Fleming et al. | 427/255.6 |
| 2003/0077435 A1* | 4/2003 | Charkoudian et al. | 428/304.4 |
| 2004/0001943 A1* | 1/2004 | Alford et al. | 428/312.6 |
| 2004/0043146 A1* | 3/2004 | Pellerite et al. | 427/207.1 |
| 2004/0141237 A1* | 7/2004 | Wohlstadter | 359/626 |
| 2004/0224303 A1* | 11/2004 | Spencer et al. | 435/4 |
| 2004/0262402 A1* | 12/2004 | Wilderbeek et al. | 235/487 |
| 2005/0030490 A1* | 2/2005 | Huibers | 353/99 |
| 2005/0231810 A1* | 10/2005 | Wohlstadter | 359/626 |
| 2006/0008678 A1* | 1/2006 | Fukushima et al. | 428/704 |
| 2006/0172082 A1 | 8/2006 | Masuda | |
| 2006/0263033 A1* | 11/2006 | Lahann et al. | 385/147 |
| 2007/0134420 A1* | 6/2007 | Koberstein et al. | 427/258 |
| 2007/0217019 A1* | 9/2007 | Huang et al. | 359/642 |
| 2007/0262027 A1* | 11/2007 | Krogue et al. | 210/688 |
| 2008/0100564 A1* | 5/2008 | Vincent et al. | 345/107 |
| 2008/0218887 A1* | 9/2008 | Deutsch et al. | 359/838 |
| 2008/0265387 A1* | 10/2008 | D'Urso et al. | 257/678 |
| 2008/0299288 A1* | 12/2008 | Kobrin et al. | 427/2.1 |
| 2008/0316302 A1* | 12/2008 | Vos et al. | 348/51 |
| 2009/0001263 A1* | 1/2009 | Sundaram et al. | 250/288 |
| 2009/0011222 A1* | 1/2009 | Xiu et al. | 428/323 |
| 2009/0190210 A1* | 7/2009 | Coleman et al. | 359/452 |
| 2009/0275826 A1* | 11/2009 | Enzerink et al. | 600/424 |
| 2010/0021744 A1* | 1/2010 | Myerson et al. | 428/426 |
| 2010/0027144 A1* | 2/2010 | Varaprasad et al. | 359/870 |
| 2010/0173326 A1* | 7/2010 | Minami | 435/7.1 |
| 2010/0307552 A1* | 12/2010 | Kohnke et al. | 136/243 |
| 2011/0149389 A1* | 6/2011 | Sharp et al. | 359/452 |
| 2011/0149390 A1* | 6/2011 | Petersen et al. | 359/452 |
| 2012/0081782 A1* | 4/2012 | Coleman et al. | 359/459 |
| 2012/0088066 A1* | 4/2012 | Aytug et al. | 428/141 |
| 2012/0206800 A1* | 8/2012 | Petersen et al. | 359/449 |
| 2012/0237675 A1* | 9/2012 | Sharp et al. | 427/163.3 |

OTHER PUBLICATIONS

Pierre Negri et al., 'Removal of Surface Contamination and Self-Assembled Monolayrs (SAMs) from Silver (Ag) Nanorod Substrates by Plasma Cleaqning with Argon', vol. 65, No. 1, 2011, pp. 1-9.*

J. Christopher Love, 'Self-Assembled Monolayers of Thiolates on Metals as a Form of Nanotechnology', Chemical Reviews, 2005, vol. 105, No. 4, pp. 1-68.*

Love et al, "Self-Assembled Monolayers of Thiolates", Chemical Reviews, vol. 105, No. 4, (2005).

Gelest, Inc., "Hydrophobicity, Hydrophilicity and Silane Surface Modification", Morrisville, PA, (www.gelest.com).

* cited by examiner

CLEANABLE COATING FOR PROJECTION SCREENS

CROSS-REFERENCE TO RELATED APPLICATIONS

This application is a continuation application of U.S. patent application Ser. No. 13/250,638, entitled "Cleanable coating for projection screen," filed Sep. 30, 2011, which is herein incorporated by reference in its entirety and which relates to and claims priority to U.S. Provisional Patent Application No. 61/388,372, filed Sep. 30, 2010, entitled "Cleanable protective coating for projection screens," the entirety of which is herein incorporated by reference.

TECHNICAL FIELD

This disclosure generally relates to coatings for screens, and more specifically relates to protective coatings for projection screens that are designed to preserve polarization for stereoscopic projection environments.

BACKGROUND

Cinema auditoriums are notoriously dirty and typically expose the projection screen to a large variety of contaminants that can negatively degrade the performance of the projection screen. A casual inspection of screens that have been installed for any significant length of time such as, greater than about a year, yields a surprising array of contaminants. In addition to the accumulation of dust, which in some cases may be significant, contaminants may include beverages such as soda, juice, tea, coffee, and so on, candy, oil residues which may be from chips, popcorn and/or popcorn butter, nachos, and spit-wads.

Dust accumulation tends to be relatively uniform spatially, representing a gradual decay in overall performance, whereas the latter named contaminants are more localized, and can thus be visually distracting. It is often difficult to remove these contaminants without causing an optical blemish through abrasive, mechanical, and/or chemical action. In certain instances, the contaminant penetrates the projection screen coatings and/or substrate, causing a stain that cannot be cleaned through typical means. Similar environmental concerns that may provide dirt and/or contaminants to the screens are also present in home, industrial, and professional environments.

BRIEF SUMMARY

According to the present disclosure, a method for providing a projection screen for receiving stereoscopic images may include providing a substrate with a contoured, reflective surface, wherein light reflected from the substrate substantially may undergo no more than a single reflection and coating a first layer on the substrate with a contoured, reflective surface. The first layer may substantially maintain the same optical properties as the substrate without the first layer. Coating the first layer may decrease the surface energy of the substrate. The substrate may substantially maintain the same polarization for incident and reflected light, and the first layer may substantially maintain a similar polarization of light as that of the incident and reflected light off of the substrate. The method may include increasing the contact angle of a fluid that may be in contact with the first layer. The first layer may be substantially conformal to the contoured, reflective surface of the substrate and also may be a self assembled monolayer coating which may be applied with a water-based spray process. The self assembled monolayer coating may molecularly bond to the contoured reflective surface of the substrate. The self assembled monolayer coating may include at least a functional group that is hydrophobic and the self assembled monolayer coating may be less than approximately 60 Angstroms after the self assembled monolayer coating dries.

According to another aspect of the present disclosure, a projection screen for receiving stereoscopic images may include a substrate with a contoured, reflective surface, wherein light reflected from the substrate may substantially undergo no more than a single reflection. The projection screen may also include a first layer coated on the substrate with a contoured, reflective surface, wherein the first layer may substantially maintain the same optical properties as the substrate without the first layer. The first layer may decrease the surface energy of the substrate.

Furthering the discussion of the projection screen, the substrate may substantially maintain the same polarization for incident and reflected light off of the substrate, and the first layer may also substantially maintain a similar polarization of reflected light off of the first layer as the polarization of the incident and reflected light off of the substrate. A contaminant may contact with the first layer and the contact angle between the contaminant and the first layer may be increased over a contact angle between the substrate and the contaminant. The first layer may be substantially conformal to the contoured, reflective surface of the substrate and may be a self assembled monolayer coating which may also be applied with a water-based spray process. The self assembled monolayer coating may include at least a functional group that is hydrophobic and may be less than approximately 60 Angstroms after the self assembled monolayer coating dries.

According to yet another aspect of the present disclosure, a method for providing a cleanable projection screen may include providing a substrate with a contoured, reflective surface, substantially eliminating double reflections of incoming light off of the contoured, reflective surface and coating a first layer on the substrate. The first layer may be a cleanable, protective layer that may substantially maintain the same optical properties of the substrate without the first layer.

These and other advantages and features of the present disclosure will become apparent to those of ordinary skill in the art upon reading this disclosure in its entirety.

DETAILED DESCRIPTION

Figure 1A:
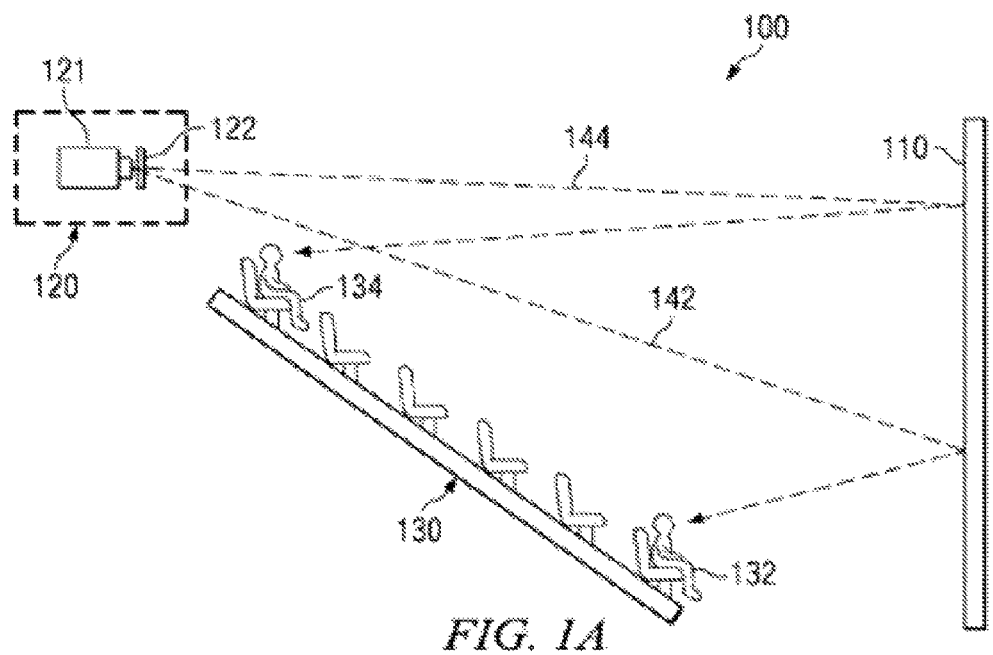
FIG. 1A is a schematic diagram illustrating a side view of a typical theatre, in accordance with the present disclosure.

According to the present disclosure, a method for providing a projection screen for receiving stereoscopic images may include providing a substrate with a contoured, reflective surface, wherein light reflected from the substrate substantially may undergo no more than a single reflection and coating a first layer on the substrate with a contoured, reflective surface. The first layer may substantially maintain the same optical properties as the substrate without the first layer. Coating the first layer may decrease the surface energy of the substrate. The substrate may substantially maintain the same polarization for incident and reflected light, and the first layer may substantially maintain a similar polarization of light as that of the incident and reflected light off of the substrate. The method may include increasing the contact angle of a fluid that may be in contact with the first layer. The first layer may be substantially conformal to the contoured, reflective surface of the substrate and also may be a self assembled monolayer coating which may be applied with a water-based spray process. The self assembled monolayer coating may molecularly bond to the contoured reflective surface of the substrate. The self assembled monolayer coating may include at least a functional group that is hydrophobic and the self assembled monolayer coating may be less than approximately 60 Angstroms after the self assembled monolayer coating dries.

According to another aspect of the present disclosure, a projection screen for receiving stereoscopic images may include a substrate with a contoured, reflective surface, wherein light reflected from the substrate may substantially undergo no more than a single reflection. The projection screen may also include a first layer coated on the substrate with a contoured, reflective surface, wherein the first layer may substantially maintain the same optical properties as the substrate without the first layer. The first layer may decrease the surface energy of the substrate.

Furthering the discussion of the projection screen, the substrate may substantially maintain the same polarization for incident and reflected light off of the substrate, and the first layer may also substantially maintain a similar polarization of reflected light off of the first layer as the polarization of the incident and reflected light off of the substrate. A contaminant may contact with the first layer and the contact angle between the contaminant and the first layer may be increased over a contact angle between the substrate and the contaminant. The first layer may be substantially conformal to the contoured, reflective surface of the substrate and may be a self assembled monolayer coating which may also be applied with a water-based spray process. The self assembled monolayer coating may include at least a functional group that is hydrophobic and may be less than approximately 60 Angstroms after the self assembled monolayer coating dries.

According to yet another aspect of the present disclosure, a method for providing a cleanable projection screen may include providing a substrate with a contoured, reflective surface, substantially eliminating double reflections of incoming light off of the contoured, reflective surface and coating a first layer on the substrate. The first layer may be a cleanable, protective layer that may substantially maintain the same optical properties of the substrate without the first layer.

Traditional unity gain or Lambertian-like screens used in two dimensional (2D) presentations do not utilize engineered surfaces for the control of light dispersion. The scatter characteristics and visually pleasing matte appearance of such screens are the result of homogenization from multiple random scattering events from very small features, for example, less than approximately 20 microns, on the screen surface and within the bulk of the material. Accumulated dust typically has low density and extremely high surface area and so to a good approximation, the effect of dust is that of an additional lambertian diffuser. Therefore, apart from a slight loss of approximately zero to ten percent in light reflection efficiency, which may be due to absorption of light by the dust, the accumulation of dust on such screen surfaces has relatively little impact on scattering characteristics.

Alternatively, other screens may have engineered surfaces designed to substantially control light dispersion. More specifically, surfaces may be designed to substantially preserve the state of polarization (SOP), and may also be somewhat intolerant of dust accumulation. For high quality passive polarized 3D projection, the depolarization in the center of the screen may be less than approximately 1.5%. Further, accumulated dust may scatter approximately 3% of the total light, thus adding an additional approximately 1.5% depolarization to the native contribution of the screen. Of note, the relative contribution of the dust may depend upon viewing angle unless the distribution profile of the screen is also lambertian. The surface of the screen can be a sophisticated optical component, and in some cases, engineered to nanometer-scale dimensions for optimum optical performance.

Additionally, once the screens with engineered surfaces are exposed to contaminants, the performance of these screens may be negatively affected. Image brightness for 2D projection may undergo a loss in light intensity of approximately 3%, which may be completely negligible. However, for 3D projection, the approximately 3% loss contributes approximately 1.5% to the depolarization. For 3d projection, this amount of loss in light intensity may provide subpar viewing conditions.

Figure 1B:
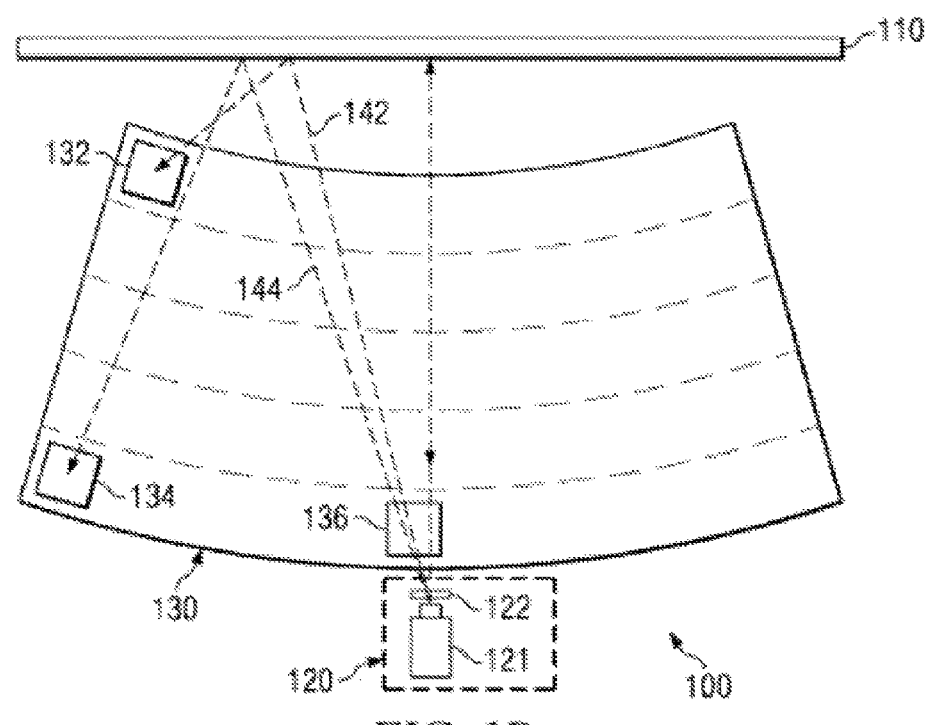
FIG. 1B is a schematic diagram illustrating a top down view of a typical theatre, in accordance with the present disclosure.

FIG. 1A is a schematic diagram illustrating a side view of a typical theatre and FIG. 1B is a schematic diagram illustrating a top down view of the typical theatre. In FIG. 1A, movie theatre 100 includes a reflective screen 110, a projector platform 120, and a viewing area 130. Projector platform 120 may include projector 121 and polarization switch 122. Viewing area 130 may provide seats organized in rows away from the screen, defining a viewing area or viewing for viewers that may sit (or stand) in different places within the viewing area 130. For instance, a first viewer may be located at the front-left viewing position 132 of the movie theatre 100, and receive reflected light 142. A second viewer may be located at the rear-left viewing position 134 and receive reflected light 144. A third viewer may be located in a central viewing position 136 as shown in FIG. 1B.

Three dimensional projection systems may project three dimensional content which may be decoded with the appropriate matched eyewear. Stated differently, three dimensional projection systems may project left and right eye images sequentially using orthogonal polarizations. Conventional reflective screens, including silver screens may reflect the polarized light from the projector 120 to the moviegoer. Further, as previously discussed, the accumulation of dust on the screen surfaces of conventional reflective screens may contribute to a loss in intensity and otherwise may not affect the scattering characteristics.

In the case of polarization preserving stereoscopic three dimensional (3D) screens, dust may produce random scatter that may negatively influence the directionality of the screen as well as the state of polarization (SOP). Preserving polarization of reflected light from a surface may include employing relatively large, design contoured features on the surface. For example, the features on the surface may be on the scale of a wavelength, and may be coated with reflective metals. Dispersive features of such surfaces may vary from approximately several microns to over 100 microns. In an abrasive cleaning process, the peaks of such features may be vulnerable, with performance easily damaged. Examples of such engineered screens are provided in commonly-owned U.S. patent application Ser. No. 12/361,532, entitled "Polarization preserving front projection screen," which is herein incorporated by reference in its entirety.

Figure 2A:
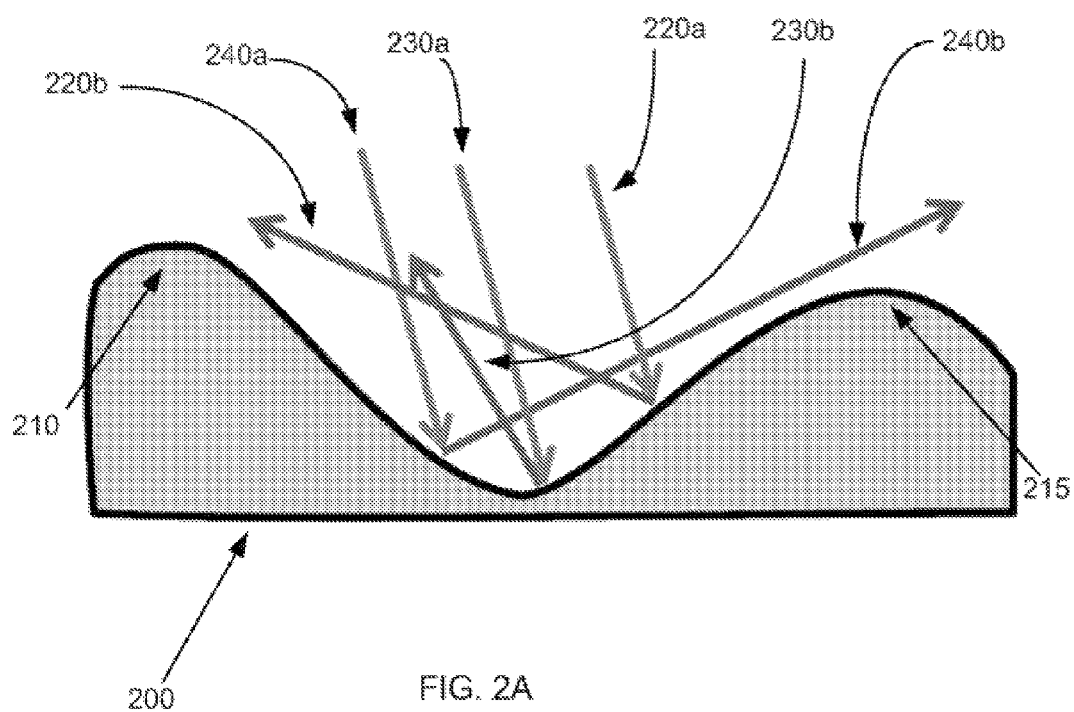
FIG. 2A is a schematic diagram illustrating a profile of a section of an engineered surface, showing how incident light is typically reflected, in accordance with the present disclosure.

FIG. 2A is a schematic diagram illustrating a profile of a section of an engineered surface, showing how incident light may be typically reflected. As shown in FIG. 2A, the engineered surface 200 may include at least contoured features 210 and 215. Although only two contoured features are shown in FIG. 2A, the screen surface may have significantly more contoured features, such as thousands to millions of contoured features across the screen surface. The number of contoured features illustrated in FIG. 2A is for discussion purposes only, and is not to be considered limiting.

Additionally in FIG. 2A, incoming ray 220a may undergo a single reflection to produce reflected ray 220b. The contoured features 210 and 215 may be located on the screen such that most to all of the incoming light may substantially undergo no more than one reflection from the contoured surface. Further, all the contoured features (not shown in FIG. 2A) may be located on the screen surface such that any incoming light may substantially undergo no more than one reflection from the contoured surface. Stated differently, the screen surface may be engineered such that double reflections of most to all of the incoming light may be substantially eliminated and most to all of the incoming light may substantially undergo no more than one reflection. Similarly and further to the discussion of FIG. 2A, incoming ray 230a may undergo a single reflection to produce reflected ray 230b and incoming ray 240a also may undergo a single reflection to produce reflected ray 240b, and so on. Moreover, the contoured features 210 and 215 may be located such that the distribution of scattered light is optimized or primarily directed to the appropriate viewing area of the theatre.

Figure 2B:
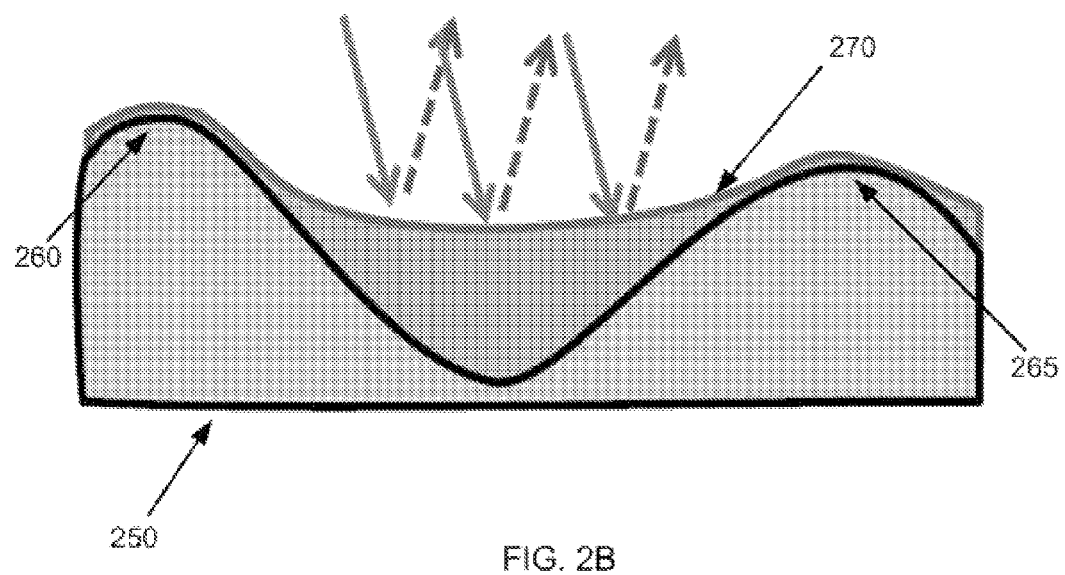
FIG. 2B is a schematic diagram illustrating a profile of a section of an engineered surface with a protective coating applied in an undesirable manner such that incident light is undesirably reflected in a uniform direction.

FIG. 2B is a schematic diagram illustrating a profile of a section of an engineered surface with a protective coating applied in an undesirable manner such that incident light is undesirably reflected in a uniform direction. As shown in FIG. 2B, the engineered surface 250 may include at least contoured features 260 and 265. Similar to FIG. 2A, although only two contoured features are shown in FIG. 2B, the screen surface may have significantly more contoured features, such as thousands to millions of contoured features across the screen surface. The number of contoured features illustrated in FIG. 2B is for discussion purposes only, and is not to be considered limiting.

Distinct from FIG. 2A, FIG. 2B includes a coating 270. As shown in FIG. 2B, the coating 270 is primarily concentrated in the low area of the engineered surface in FIG. 2B. In one example, as the coating 270 dries, the free energy of the coating 270 may be minimized by minimizing the roughness of the free fluid surface. The free energy of the coating 270 will be discussed in further detail herein. Because the coating 270 is somewhat planarized, the reflected light may be in a relatively more uniform direction and the distribution of the scattered light of the contoured surface may be significantly altered.

Additionally, in one example, it may be possible to encapsulate the engineered surface in a thick durable transparent overcoat with a matte surface such as a dielectric to eliminate hot spots or areas with high reflectivity in the specular direction. However, in this example, burying the functional layer beneath a non-conformal random dielectric may negatively affect both the diffusion and polarization preservation properties of the screen. Partial and total internal reflection within the dielectric layer may produce additional, undesirable reflections that may modify the gain profile and may also degrade the polarization. In the case that polarization of the reflected light is degraded or not maintained, the left and right eye images may be visible to the opposite eye. Stated differently, when the polarization of reflected light is not maintained, the left eye images may be visible in the right eye and the right eye images may be visible in the left eye.

The present disclosure provides a coating which, while substantially maintaining the optical properties of the surface, may decrease the surface energy such that contaminants either substantially fail to bond to the surface or bond weakly. The surface energy of the coating on the surface and contaminants will be discussed in further detail herein.

Figure 3A:
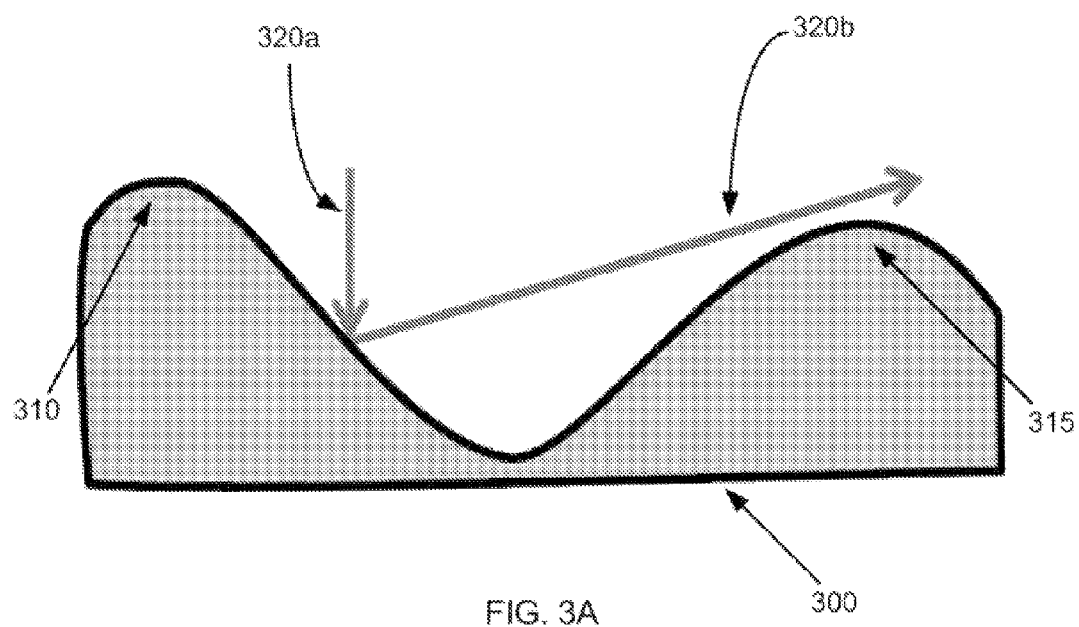
FIG. 3A is a schematic diagram illustrating a profile of a section of an engineered surface, showing how incident light is typically reflected, in accordance with the present disclosure.

FIG. 3A is a schematic diagram illustrating a profile of a section of an engineered surface, showing how incident light may be typically reflected. FIG. 3A is similar to FIG. 2A and includes the engineered surface 300 with at least the contoured features 310 and 315. Also illustrated in FIG. 3A is incoming ray 320a and reflected ray 320b. The incoming and reflected rays 320a and 320b respectively, may illustrate a single reflection off of the engineered surface 300. Furthermore, reflected ray 320b may illustrate that the distribution of the scatter profile may be greater than if the reflected ray 320b were to reflect off of a substantially planarized surface such as illustrated by the coating 270 of FIG. 2B.

Figure 3B:
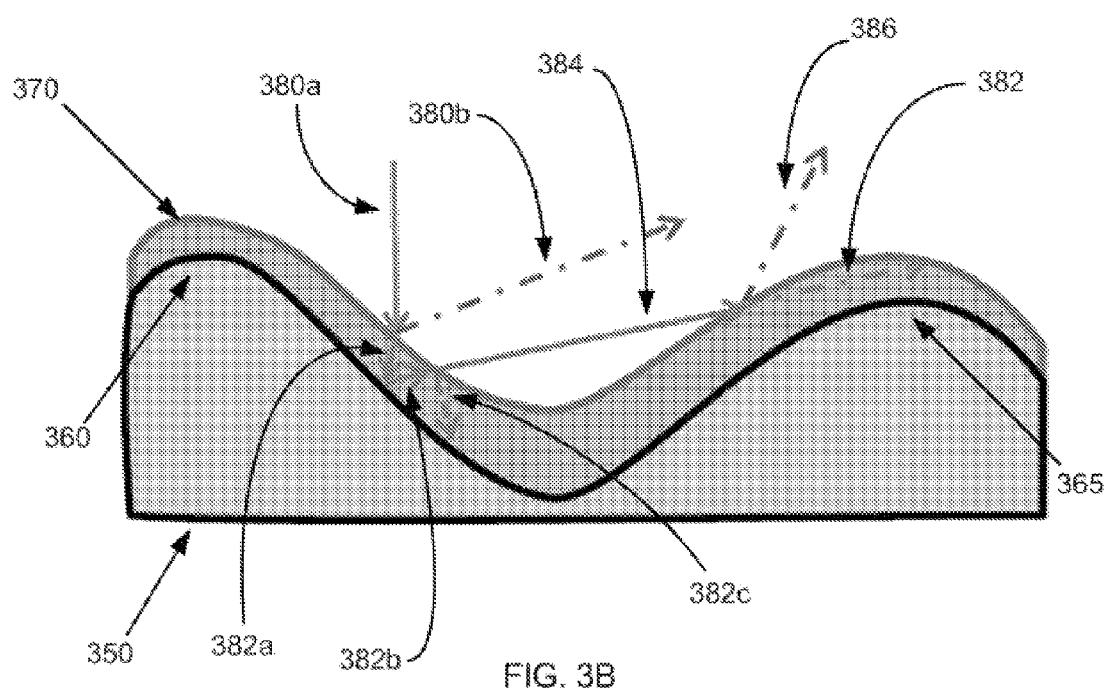
FIG. 3B is a schematic diagram illustrating a profile of a section of an engineered surface with a protective coating applied in a manner such that incident light is reflected in a manner that does not preserve polarization.

FIG. 3B is a schematic diagram illustrating a profile of a section of an engineered surface with a protective coating applied in a manner such that incident light is reflected in a manner that does not preserve polarization. Similar to FIG. 2B, FIG. 3B illustrates an engineered surface 350 that may include at least two contoured features 360 and 365. Similar to FIGS. 2A, 2B, and 3A, although only two contoured features are shown in FIG. 3B, the screen surface may have a significantly greater number of contoured features. Two contoured features are illustrated in FIG. 3B for discussion purposes only and should not be construed as a limitation of the disclosure.

FIG. 3B also illustrates a coating 370. Distinct from the coating 270 of FIG. 2B, coating 370 of FIG. 3B may be substantially conformal and may not accumulate in the low area between the contoured features 360 and 365. Even though the coating 370 may conform to the engineered surface 350, the thickness of coating 370 may be such that undesirable partial reflection of light and refraction may occur within the coating. As shown in FIG. 3B, incoming ray 380a may produce reflected ray 380b. However, incoming ray 380a may also produce refracted ray 382a and internally reflected rays 382b and 382c. Internally reflected ray 382b may produce ray 384 which may reflect off of contoured feature 365 to produce reflected ray 386. Continuing the discussion of FIG. 3B, ray 384 may also produce refracted ray 382 within the coating 370.

The partial reflection of light and refraction illustrated in FIG. 3B may modify the gain properties of the screen without the coating 370, thus the coating 370 may fail to substantially maintain the optical properties of the engineered surface 350, and accordingly, the screen. Of note, for polarization preserving screens, the thickness of coating 370 may cause an increase in the number of undesirable multiple reflection events that a single ray may experience which may be a primary source of depolarization of polarized light. Conformal coatings that are approximately one half of a wavelength in thickness may improve the reflectivity in the approximate range of 75-80% for bare aluminum to over approximately 90% in the visible region of the spectrum, but such thicknesses, generally do not significantly enhance the durability against the abrasive cleaning action.

Figure 3C:
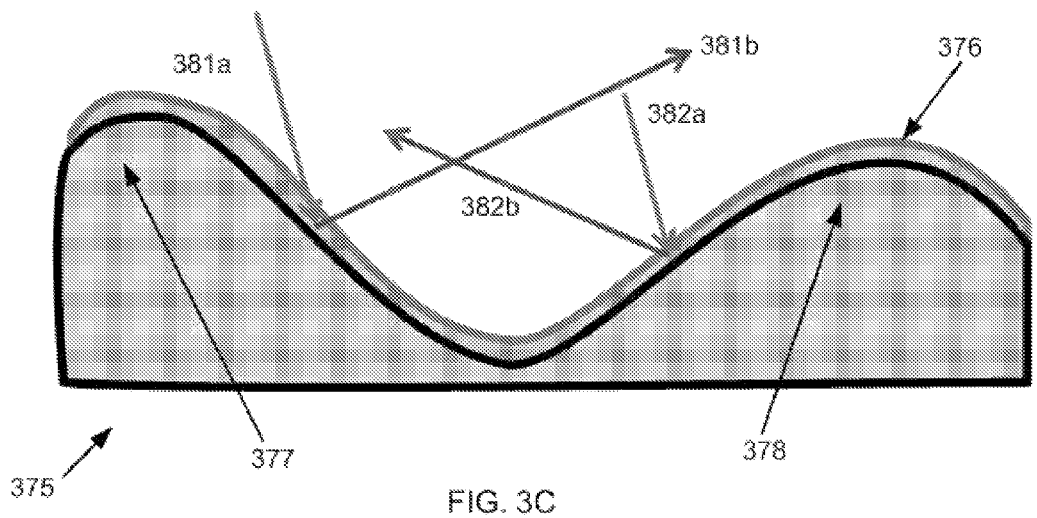
FIG. 3C is a schematic diagram illustrating a profile of a section of an engineered surface with a protective coating applied in a manner such that incident light is reflected in a manner that preserves polarization.

FIG. 3C is a schematic diagram illustrating a profile of a section of an engineered surface with a protective coating applied in a manner such that incident light is reflected in a manner that preserves polarization. Similar to FIG. 3B, FIG. 3C includes a coating 376. As illustrated, the coating 376 of FIG. 3C is substantially conformal and may not substantially accumulate in the low area between the contoured features 377 and 378. Further, FIG. 3C illustrates a sufficiently thin coating 376 which may be such that desirable reflection of light may occur in that the polarization of the incoming may be substantially preserved when reflected.

Further in FIG. 3C, coating 376 is sufficiently thin so that refraction and internal reflections may not occur due to the coating 376 or in the case they do occur, they may be negligible. In FIG. 3C incoming ray 381a reflects and produces reflected ray 381b. The reflected ray 381b may reflect in a similar manner as a ray that may reflect off of the substrate without the coating 376. Likewise, incoming ray 382a reflects off of the coating 376 and produces reflected ray 382b, in a similar manner as a ray that may reflect off of the substrate without the coating 376.

Figure 4:
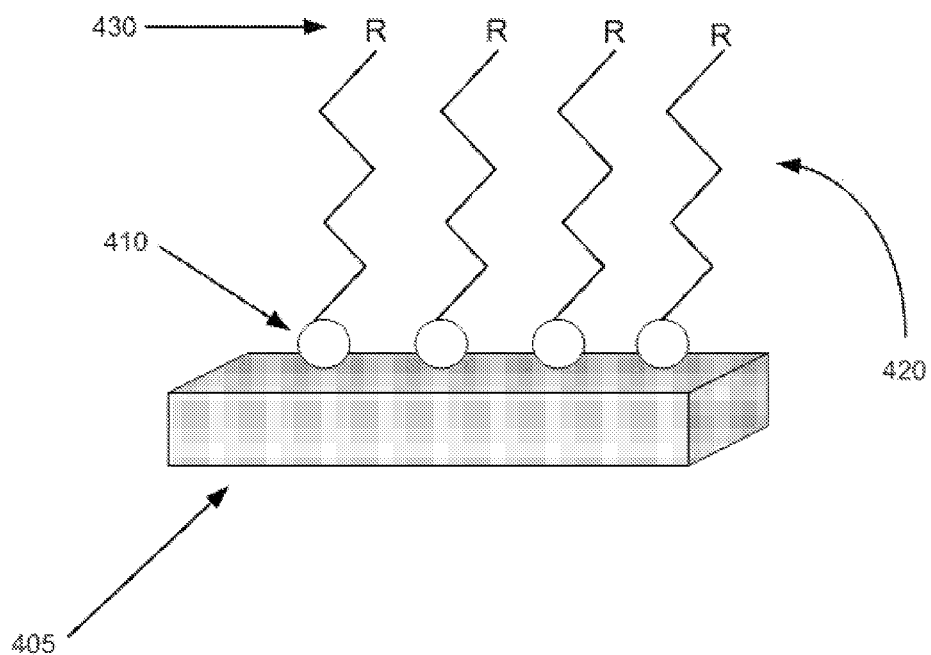
FIG. 4 is a schematic diagram illustrating a representation of a self assembled monolayer structure on a substrate, in accordance with the present disclosure.

One embodiment of a conformal coating is a Self Assembled Monolayer (SAM) coating that may molecularly bond to the engineered surface. A SAM is an organized layer of amphiphilic molecules in which one end of the molecule, the "head group" shows a special affinity for a substrate. SAMs also typically have a tail with a functional group at the terminal end as seen in FIG. 4. FIG. 4 is a schematic diagram illustrating a representation of a self assembled monolayer structure on a substrate. In FIG. 4, the head group 410 is depicted as bonded to the substrate 405. The substrate 405 may include an engineered surface (not shown), and the head group 410 may bond to the engineered surface as well. Also as shown in FIG. 4, the SAM coating may include a tail 420, and a functional group 430. In one example, the functional group 430 may be hydrophobic.

The SAM coatings may lower the contact angle of the surface as measured by water or oil contact angles. For example, the water contact angle of an aluminum surface may increase from less than approximately 60° to greater than approximately 100°. Because of the chemical bond between the SAM coating and the substrate, the coating may exhibit at least some resistance to light abrasion that may occur when cleaning and may remain substantially chemically unaffected by typical cleaning solvents. The thickness of such monolayers may be significantly smaller than the wavelength of visible light, for example less than approximately 50 nm, and so the impact on the surface reflectivity may be extremely small or negligible.

Another embodiment of a screen coating may be conformal to the underlying surface. This may minimize the impact on the distribution of scattered light of the additional optical surface such that depolarization may remain less than approximately 1.5% within the center of the screen or such that the change in gain may be less than approximately 10%. However, unless the conformal coating is also very thin, for example, less than approximately 0.5 microns, there may be an impact to the distribution of scatter light and polarization primarily due to internal reflections within the coating.

Returning to the discussion of FIG. 3B, thick conformal coatings, such as coating 370, may allow partial reflection of light and refraction within the coating. The partial reflection and refraction within the coating may modify the designed gain properties of the screen. Also as previously discussed, for polarization preserving screens, the thick coating may increase the number of undesirable multiple reflection events that a single ray may experience which may be a primary source of depolarization. Conformal coatings that may be a fraction of a wavelength in thickness can actually improve the reflectivity over a broad range of the spectrum, but such thicknesses do not significantly enhance the durability against the abrasive cleaning action. Finally, for polarization preserving screens, it may be desirable for the transparent optical coating to have extremely low birefringence such that the retardance within the layer is less than approximately 5 nm.

General approaches for cleaning the surface of the screen may include manufacturing the screen such that the surface may be substantially unaffected by an amount of abrasion sufficient to substantially clean any contaminant, and/or may also include the identification of a cleaning prescription that may substantially remove contaminants substantially without undue abrasion. The first solution may be complicated by both the optical nature of the screen and the need to not modify it to affect its optical designed performance characteristics, as well as the flexible nature of the screen surface. Due to the wide variety of contaminants possible, the second solution has limited usefulness.

A cinema projection screen may uniformly scatter reflected light into the viewing area while avoiding sending any substantial reflections in any one direction. Should substantial reflections occur in approximately the same direction, the result may be a hotspot. For example, a smooth transparent coating on a diffusing substrate may produce an undesirable, sharp approximately four percent spike in reflectivity in the specular direction. In practice this may indicate that the surface should be sufficiently rough on a microscopic scale such that there may be no well defined reflection direction. This desired roughness may be the main source of difficulty in cleaning the screen surface. The relatively high surface area may improve the adhesion of contaminants. Additionally, the micro/meso-scopic pits and valleys in the surface may protect some contaminants from abrasive cleaning. Abrasive action applied to the screen surface may impart more force and thus more damage to the peaks of the rough surface. Therefore, inadvertent modification to the distribution of light scattered from the screen may occur.

Should the surface have a relatively high free energy, then fluid contaminants may tend to wet the surface. At the same time, the free energy of the fluid is minimized by minimizing the roughness of the free fluid surface. As the fluid dries, it will attempt to maintain the smooth free surface by concentrating in the low areas as shown in FIG. 2B. Except for extremely macroscopically rough surfaces or thin initial fluid applications, the result may be a substantially planarized surface with increased hotspots and in which the filled valleys tend to reflect incident light in a substantially uniform direction.

By decreasing the surface energy of the screen, it may be possible to increase the contact angle of many contaminating fluids. Because of the vertical orientation of the screen, this may allow many contaminants to simply de-wet and then "roll" off the surface. Any contaminants that do adhere to the surface may bond with lower energy. Therefore the cleaning process necessary to remove such stains can be significantly less aggressive.

In some cases it is possible to loosen the adhesion of a stain by soaking the surface in a mild solvent. However, in a cinema environment it is difficult to apply a fluid solvent to the vertically installed surface for sufficient durations. Furthermore, in the case of aluminum coated diffusers, the thin aluminum coating is especially vulnerable to reaction with water or other solvents.

There are various oxide coatings such as, but not limited to, MgF2, SiO2, and so on, that may be available that can substantially increase the abrasion resistance of a surface. For example, a cleaning method may be employed on a surface and may damage the surface such that the damage may be reasonably visible to a viewer. Continuing the example, a coating may be deposited on the surface and the same cleaning method may damage the surface less than a just noticeable difference. Even so, it may be impractical to apply such evaporative coatings to the large area of a cinema screen after it has been seamed and/or sprayed with silver paint. The hard nature of these coatings also makes them brittle and therefore prone to cracking on the flexible surface of the roll stock prior to seaming.

Aluminum coated first-surface diffusers as described in U.S. Pat. Pub. No. 2009/0190210, which is herein incorporated by reference in its entirety, may prove to be an especially difficult case to clean. Due to the relatively small size of the features which may be employed for such a structure, the bare aluminum and any native oxide that grows on it may have insufficient durability to most sources of abrasion. The dominant failure mechanism may be removal of the evaporated/ sputtered aluminum film. Further, due to the brittle nature of the oxide, insufficient support of the surface by the polymer substrate may lead to cracking of the film. If the adhesion of the aluminum is stronger than the adhesion of the aluminum to the substrate then the aluminum can be completely removed. Otherwise only the oxide may be removed which may allow the aluminum to be further damaged by subsequent abrasion or by oxidation.

Recognizing the difficulties with abrasively cleaning a cinema screen or cleaning it by means of a solvent, it is desirable to prevent or minimize adhesion of stains. This can be accomplished by decreasing the surface energy of the screen surface. The change in surface energy may be directly observable as an increase in the water-contact angle to greater than approximately 80 degrees and in some cases greater than approximately 110 degrees. This de-wetting of water is referred to as hydrophobicity.

In the case of conventional cinema screens, the protective coating should ideally be compatible with air-spray application and should not require heating of the substrate in order to cure the coating.

Recently, a new class of hydrophobic SAM (self-assembling monolayer) coatings has become available which has several desirable properties. Currently these films manufactured by companies such as Aculon, located in San Diego, Calif., may be used for protecting eyeglasses, displays, jewelry, stainless steel, and as mold release agents.

In another embodiment a SAM coating can be used to modify the mechanical properties of a screen surface to enable cleaning, with little to zero impact on the optical properties. SAM coatings may also be compatible with screen manufacturing processes, as they may be applied in a water-based spray process. The SAM coating can be applied as a final coat, in a conventional screen manufacturing process, or can be applied using any number of wet coating processes for manufacturing screen materials that are seamed after coating, including such screen materials as UV embossed and metalized surfaces. A SAM coating in accordance with the present disclosure, may be applied in two or more applications to insure coverage, with a dried thickness of less than approximately 60 Angstroms. It may be applied directly to the reflective coating or to a thin conformal dielectric overcoat, which may be employed to, for example, substantially eliminate the growth of native oxide.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of the embodiment(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A method for providing a projection screen for receiving stereoscopic images, comprising:

providing a substrate with an engineered surface, the engineered surface comprising a contoured, reflective, and metallized surface, wherein light reflected from the substrate substantially undergoes no more than a single reflection; and coating a first layer on the substrate with the engineered surface, wherein the first layer substantially maintains the same optical properties as the substrate without the first layer, further wherein the substrate substantially maintains the same polarization for incident and reflected light, further wherein the first layer substantially maintains a similar polarization of light for incident and reflected light.

2. The method of providing a projection screen of claim 1, wherein coating the first layer further comprises decreasing the surface energy of the substrate with a contoured, reflective surface.

3. The method of providing a projection screen of claim 1, further comprising increasing the contact angle of a fluid, wherein the fluid is in contact with the first layer.

4. The method of providing a projection screen of claim 1, wherein the first layer is substantially conformal to the contoured, reflective surface of the substrate.

5. The method of providing a projection screen of claim 1, wherein the first layer is a self assembled monolayer coating.

6. The method of providing a projection screen of claim 5, wherein the self assembled monolayer coating molecularly bonds to the contoured reflective surface of the substrate.

7. The method of providing a projection screen of claim 5, wherein the self assembled monolayer coating includes at least a functional group that is hydrophobic.

8. The method of providing a projection screen of claim 5, wherein the self assembled monolayer coating is less than approximately 60 Angstroms after the self assembled monolayer coating is dry.

9. The method of providing a projection screen of claim 5, wherein the self assembled monolayer coating is less than approximately 60 Angstroms after the self assembled monolayer coating is dry.

10. The method of providing a projection screen of claim 1, wherein coating the first layer further comprises applying the first layer with a water-based spray process.

11. A projection screen for receiving stereoscopic images, comprising:
    a substrate with an engineered surface, the engineered surface comprising a contoured, reflective, and metallized surface, wherein light reflected from the substrate substantially undergoes no more than a single reflection; and
    a first layer coated on the substrate with a contoured, reflective surface, wherein the first layer substantially maintains the optical properties as the substrate without the first layer, further wherein the substrate with the engineered surface substantially maintains the same polarization for incident and reflected light, further wherein the first layer substantially maintains a similar polarization of light for incident and reflected light.

12. The projection screen of claim 11, wherein coating the first layer further comprises decreasing the surface energy of the substrate.

13. The projection screen of claim 11, wherein a contaminant is in contact with the first layer, further wherein the contact angle between the contaminant and the first layer is increased.

14. The projection screen of claim 11, wherein the first layer is substantially conformal to the contoured, reflective surface of the substrate.

15. The projection screen of claim 11, wherein the first layer further comprises a self assembled monolayer coating.

16. The projection screen of claim 15, wherein the self assembled monolayer coating includes at least a functional group that is hydrophobic.

17. The projection screen of claim 11, wherein coating the first layer further comprises applying the first coating with a water-based spray process.

18. A method for providing a cleanable projection screen, comprising:
    providing a substrate with an engineered surface, the engineered surface comprising a contoured, reflective, and metallized surface;
    substantially eliminating double reflections of incoming light off of the contoured, reflective surface; and
    coating a first layer on the substrate with the engineered surface, wherein the first layer is a cleanable, protective layer that substantially maintains the same optical properties of the substrate without the first layer, further wherein the substrate substantially maintains the same polarization for incident and reflected light, further wherein the first layer substantially maintains a similar polarization of light for incident and reflected light.

* * * * *